(12) United States Patent
Brown et al.

(10) Patent No.: US 7,619,032 B2
(45) Date of Patent: Nov. 17, 2009

(54) AQUEOUS POLYMER DISPERSIONS WITH HIGH UNSATURATED FLOW PROMOTER CONTENT

(75) Inventors: Steven C. Brown, Pottstown, PA (US); Catherine A. Finegan, Warrington, PA (US); William D. Rohrbach, Perkasie, PA (US); Wei Zhang, Maple Glen, PA (US)

(73) Assignee: Rohm and Haas Company, Philadelphia, CA (US)

( * ) Notice: Subject to any disclaimer, the term of this patent is extended or adjusted under 35 U.S.C. 154(b) by 381 days.

(21) Appl. No.: 11/637,413

(22) Filed: Dec. 12, 2006

(65) Prior Publication Data

US 2007/0135557 A1   Jun. 14, 2007

Related U.S. Application Data

(60) Provisional application No. 60/749,424, filed on Dec. 12, 2005.

(51) Int. Cl.
*C08K 5/101* (2006.01)
(52) U.S. Cl. .......................... 524/543; 524/80; 524/556; 525/167.5
(58) Field of Classification Search ................. 524/543, 524/556, 80; 525/167.5
See application file for complete search history.

(56) References Cited

U.S. PATENT DOCUMENTS

| 4,699,966 | A |   | 10/1987 | Harris et al. |
| 5,484,849 | A | * | 1/1996 | Bors et al. ............... 525/167.5 |
| 5,521,266 | A | * | 5/1996 | Lau .............................. 526/200 |
| 5,559,192 | A |   | 9/1996 | Bors et al. |
| 6,969,734 | B1 | * | 11/2005 | Pressley et al. ............. 524/115 |
| 2003/0187103 | A1 |   | 10/2003 | Bloom et al. |
| 2004/0039095 | A1 |   | 2/2004 | Van de Mark et al. |

FOREIGN PATENT DOCUMENTS

| EP |   22522    | 1/1981 |
| JP | 1988197544 | 1/1992 |
| JP |  199447837 | 2/1994 |
| WO | WO 89/08092 | 9/1989 |
| WO | WO 0056823  | 9/2000 |

OTHER PUBLICATIONS

Moran et al, "Cavitands: Synthetic Molecular Vessels", Journal of the American Chemical Society, vol. 184, 1982, pp. 5826-5828.
Takai et al, "Binding Characteristics of a New Host Family of Cyclic Oligosaccharides from Inulin: . . . ", Journal of Organic Chemistry, 1994, vol. 59, No. 11, pp. 2967-2975.

* cited by examiner

*Primary Examiner*—David Wu
*Assistant Examiner*—Satya B Sastri
(74) *Attorney, Agent, or Firm*—Cantor Colburn LLP; Robert Stevenson

(57) ABSTRACT

An aqueous composition comprising dispersed particles comprising: at least one unsaturated flow promoter and at least one copolymer formed by the polymerization of at least one ethylenically unsaturated nonionic monomer and at least one monomer bearing a pendant functionality which can react with the unsaturated flow promoter upon drying and exposure to oxygen.

12 Claims, No Drawings

AQUEOUS POLYMER DISPERSIONS WITH HIGH UNSATURATED FLOW PROMOTER CONTENT

This application claims the benefit of priority under 35 U.S.C. § 119(e) of U.S. Provisional Patent Application No. 60/749,424, filed on Dec. 12, 2005.

This invention relates to aqueous dispersions comprising polymer particles and flow promoters containing unsaturated carbon-carbon bonds, as well as methods for making the dispersions. More particularly, high levels of the flow promoters are present in the polymer particles of the inventive dispersion. The dispersions are useful in a variety of coating applications.

Unsaturated oils, such as the drying and semi-drying oils, have long been used in coatings due to their capacity to undergo "cure" reactions upon exposure to oxygen. While the oxidative cure behavior of these oils can contribute to desirable coatings performance properties, such as the development of film hardness, coatings based on these oils suffer from certain other limitations, most notably durability. By contrast, coatings based on aqueous dispersions of polymers formed from ethylenically unsaturated monomers can achieve superior durability, but in many applications other performance characteristics of such systems can benefit from the presence of materials that cure after the coating has been applied to a substrate. As a result of these complementary performance profiles there have been many efforts to combine the desirable performance attributes of curing oils, and their derivatives with aqueous dispersion polymers.

U.S. Patent Publication No. 2004/0039095A1 discloses a film-forming composition comprising a continuous aqueous phase and a dispersed phase. The dispersed phase comprises (i) a particulate polymer or emulsified liquid prepolymer, and (ii) a coalescent aid comprising an ester having the formula RCOOX wherein R and X are independently hydrocarbyl or substituted hydrocarbyl and at least one of R and X comprises at least two unsaturated carbon-carbon bonds.

With this invention, we provide aqueous compositions comprising disperse polymer particles and high levels of unsaturated flow promoters that offer enhanced performance, particularly in coatings for porous or weathered substrates. Further, we discovered a process by which such compositions can be formed.

One aspect of this invention is an aqueous composition comprising from 5 to 60% by weight dispersed particles, the particles comprising: (1) at least one copolymer A; and (2) from about 15 to 100% by weight, based on the weight of the copolymer, of at least one unsaturated flow promoter with a segmental polarity difference of no greater than 8 relative to the polymer; wherein copolymer A is formed by the polymerization of at least one ethylenically unsaturated nonionic monomer and at least one monomer bearing a pendant functionality which can react with the unsaturated flow promoter upon drying and exposure to oxygen, wherein from about 75 to 100% by weight of the copolymer has a Mw of from about 1,000 to 100,000.

One embodiment of this invention is where from about 5 to 100% by weight of the copolymer has a Mn of from 1,000 to 40,000.

Another embodiment of this invention is where the copolymer comprises from 0.5 to 20% by weight, based on the total weight of copolymer, at least one copolymerized monomer bearing pendant functionality which reacts with unsaturated flow promoter upon drying and exposure to oxygen.

Another embodiment of this invention is where the composition comprises from 0.1 to 20% by weight, based on the total weight of unsaturated flow promoter, of at least one macromolecular organic compound having a hydrophobic cavity.

Another embodiment of this invention is where composition comprises from 0.1 to 20% by weight, based on the total weight of unsaturated flow promoter, of at least one macromolecular organic compound having a hydrophobic cavity.

Another embodiment of this invention is where the pendant functionality is acetoacetate.

Another embodiment of this invention is where the composition further comprises at least one auto oxidation catalyst A second aspect of this invention is a composition, comprising:
(a) an aqueous dispersion of polymer particles, said particles comprising from 75 to 100% by weight, based on the total weight of polymer, polymer having Mw of from 1,000 to 100,000;
(b) from 15 to 100% by weight, based on the weight of said polymer, at least one unsaturated flow promoter, and
(c) from 0.1 to 20% by weight, based on the total weight of flow promoter, at least one macromolecular organic compound having a hydrophobic cavity.

One embodiment of this second aspect is where a, b, and c are maintained at a temperature of from 40 to 90° C. for at least 15 minutes.

A challenge in protecting many porous or weathered substrates with sealants or coatings is achieving an adequate degree of penetration of protective components into the substrate. In the absence of good penetration, a protective composition after it dries may fail to adhere to the substrate and/or to limit the penetration of moisture into the substrate. The aqueous dispersions of this invention are capable of penetrating deeply into porous substrates and providing superior substrate protection from moisture's harmful effects. It is a further benefit of the dispersions of this invention that these objectives can be achieved in an environmentally friendly fashion.

We were trying to find ways to overcome the problems of latex polymer flow into porous substrates such as wood and masonry to achieve acceptable coatings on such substrates. Normally, when aqueous coating formulations containing latex particles are applied to such substrates, the water carrier rapidly leaves the surface coating by either by evaporation or absorption into the channels of the substrate, or both. When the water rapidly leaves a latex coating, the latex particles coagulate form plugs of polymer that have very limited flow. With limited flow, the particles are unable to penetrate deep into the porous channels due to clogging at the substrate surface. The result is a coating that has low durability.

With this invention, we can add a high level of an unsaturated flow promoter that can be dissolved in the latex particles, thus capable of acting as a solvent for the polymer, decreasing the viscosity of the polymer to such a point as flow into substrate channels is achieved even as the water is rapidly leaving the coating. In this invention, after the flow promoter has facilitated polymer flow into the substrate, it then acts as a crosslinking agent for the polymer due to the unsaturation present in the flow promoter. Without this curing reaction, the low viscosity and low molecular weight of the polymer solution would leave a coating too tacky and insufficiently durable to be useful as a protective coating for wood or masonry.

The term "pendant" means "attached to the polymer backbone and available for further reaction." The term "pendant" also includes attachment of such groups at the termini of a polymer chain.

"Nonionic monomer" means that the copolymerized monomer residue does not bear an ionic charge between pH=1-14.

"(Meth)acrylic" denotes both the methacrylic and acrylic monomers described.

Unless otherwise specified, the term "Mn" refers to the number average molecular weight as determined by size exclusion chromatography ("SEC") using polystyrene narrow standard calibration such as for example, EasiCal PS-2TM polystyrene standards supplied by Polymer Laboratories.

Unless otherwise specified, the term "Mw" refers to the weight average molecular weight as determined by SEC using polystyrene narrow standard calibration such as for example, EasiCal PS-2TM polystyrene standards supplied by Polymer Laboratories.

"Tg" means the glass transition temperature determined by differential scanning calorimetry ("DSC") using a heating rate of 10° C./minute, taking the mid-point in the heat flow versus temperature transition as the Tg value.

A volatile organic compound ("VOC") is an organic compound that has a boiling point below 280° C. at atmospheric pressure.

Unless otherwise specified, the term "particle size" refers to the number average particle diameter as determined using a capillary hydrodynamic fractionation apparatus, such as the Matec CHDF-2000 apparatus (Matec Applied Sciences, MA) with ultraviolet detection at 200 nm. Particle size standards are provided by National Institute of Standards and Technology ("NIST") traceable polystyrene standards of 50 to 800 nm.

Flow promoters suitable to the invention have a segmental polarity difference of no greater than 8 relative to the polymer. The segmental polarities (SP) were calculated as follows:

$$SP = 1000 \times \frac{(\log_{10}(K_{oil\text{-}water}) - 0.229)}{MolVol} \quad (1)$$

Here, $\log_{10}(K_{oil\text{-}water})$ is the so-called log P value and MolVol is the molecular volume for the compound being studied. For a compound M, $K_{oil\text{-}water}$ is the ratio of the M concentrations in 1-octanol and in water $$\log_{10}(K_{oil\text{-}water}) = \log_{10}\left(\frac{[M]_{octanol}}{[M]_{water}}\right) \quad (2)$$

$\text{Log}_{10}(K_{oil\text{-}water})$ was calculated using the KOWWIN program which is available, from among other places, from a U.S. Environmental Protection Agency website: http://www.epa.gov/opptintr/exposure/docs/episuite.htm KOWIN is also the subject of a number of scientic papers, e.g., Benfenati et al., "Predicting log P of Pesticides Using Different Software, *Chemosphere* (2003), 53(9), 1155-64.

KOWWIN calculates $\log_{10}(K_{oil\text{-}water})$ as a sum of contributions from molecular fragments:

$$\log_{10}(K_{oil\text{-}water}) = 0.229 + \sum_{fragment\,sin\,molecule} N_{frag} C_{frag} \quad (3)$$

MolVol is calculated using the method described in Zhao, Y. H.; et al., *J. Org. Chem.* 2003, 68, 7368-7373

The physical rationale for using the segmental polarity in this way is that Flory-Huggins theory and its derivatives show that the free energy of mixing of molecules with very different sizes is better predicted by using the volume fractions (aka segment concentrations) of each species rather than the mole fractions of each. For a recent discussion, see Fornasiero, F et al. *Macromolecules* 2005, 38, 1364-1370

$K_{oil\text{-}water}$ for compound M is related to the free energies of M-octanol and M-water mixing. But $K_{oil}$-water is expressed in terms of molar concentrations. We can put $K_{oil\text{-}water}$ onto a segmental basis by dividing by the molecular volume, as is done in eq. 1.

Shown below are two detailed examples for computing segmental polarity, one for a flow promoter and one for a polymer.

A. Flow Promoter: (in this Example, a Mono-Ester with One Unsaturation)

1. Start the KOWWIN program.

2. Enter the SMILES notation for the compound: CCCCCCCCC=CCCCCCCCCC(=O)OCC(O)C SMILES is an established notation for describing molecular structure. A description, with enough guidelines to write a SMILES for almost any compound, was published in Weininger et al., "SMILES. 2. Algorithm for Generation of Unique SMILES Notation," *J. Chem. ZnJ Comput. Sci.* 1989, 29, 97-101, and also available at http://www.syrres.com/esc/docsmile.htm 2. With SMILES; obtain the result log KOW ($\log_{10}(K_{oil\text{-}water})$)=7.9507 and the molecular formula for the compound: C22H42O3. You will use the molecular formula to calculate the molecular volume.

3. From the Zhao et al. reference, use this formula for molecular volume: MolVol=−5.92($N_{atoms}$−1)+7.24$N_H$+20.58$N_C$+14.71$N_O$ Here, $N_{atoms}$ is the number of atoms in the molecule (67), $N_C$ is the number of carbon atoms (22), $N_H$ is the number of hydrogen atoms (42), and $N_O$ is the number of oxygen atoms (3). [If the flow promoter contains rings use a different formula—but this is described in the reference. Also, if the flow promoter contains atoms other than C, H, O use coefficients for these hetero atoms—but coefficients for many atoms are given in the reference. For the mono-ester with one unsaturation, MolVol=410.25.

4. Calculate the segmental polarity (SP) as SP=1000((log KOW)−0.229)/Molvol=1000(7.9507−0.229)/410.25=18.82.

5. The calculated segmental polarity for this particular diester, where the OH functionality of the monoester has been esterified with an additional fatty acid, is 23.1.

B: Polymer

Segmental polarity for a polymer is the weighted average of the segmental polarities of the polymerized monomers of which it is composed. However, because polymerized monomers are not chemically discrete molecules, an adjustment must be made in computing the segmental polarity of a polymerized monomer. For instance, the polymerized monomer of butyl acrylate is

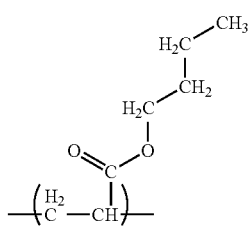

To compute the polymerized monomer segmental polarity, the adjustment involves using a methyl-blocked monomer in the calculation. For butyl acrylate (for example), this would be

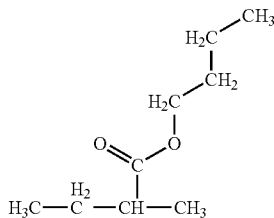

Adding the blocking methyl groups turns the polymerized monomer mathematically into a chemically discrete molecule. Since log10(Koil-water) is computed as a sum of contributions from the various functional groups, the adjustment further involves subtracting the contributions from the two extra methyl groups to get log10(Koil-water) for the polymerized monomer unit.

Here is an example of how to get the segmental polarity for polymerized butylacrylate:

1. Start the KOWWIN program.
2. Enter the SMILES notation for methyl-blocked polymerized BA: CCC(C)C(=O)OCCCC
3. Hit the Calculate button; obtain the result log KOW ($\log_{10}(K_{oil\text{-}water})$)=3.2462 and the molecular formula for the compound: C9H18O2. In the KOWWIN program, as described in the references, it is established that a methyl group attached to an alkyl group contributes 0.5473 to the log K. Thus, the contribution of 2 methyl groups to the log K for methyl-blocked polymerized BA is calculated as (2×0.5473=1.0946). Subtract two methyls to get the true molecular formula for polymerized BA:C7H12O2. This will be used in the molecular volume calculation.
4. From the Zhao et al. reference, use this formula for molecular volume: MolVol=−5.92$N_{atoms}$+7.24$N_H$+20.58$N_C$+14.71$N_O$ Here, $N_{atoms}$ is the number of atoms in the molecule (21), $N_C$ is the number of carbon atoms (7), $N_H$ is the number of hydrogen atoms (12), and $N_O$ is the number of oxygen atoms (2). [This formula is slightly different from the one given for the oil above, because we must account for the extra bond in the polymerized monomer. For more details, see the reference. For polymerized butyl acrylate, Mol-Vol=136.04.
5. Calculate the segmental polarity ("SP") as SP=1000 ((log KOW)−1.09646−0.229)/Molvol=1000(3.2462−1.0946−0.229)/136.04=14.12. The 1.0946 is subtracted to remove the effect of the blocking methyl groups.

Thus, the segmental polarity for butylacrylate homopolymer is 14.12. For a copolymer, the segmental polarity is the weighted average of the polymerized monomer segmental polarities. For example, a 50 BA/50 MMA (SP=8.90) copolymer has SP=0.5*14.12+0.5*8.90=11.51. Segmental polarities for selected other polymers are shown in the table below:

| Polymer Composition | Segmental Polarity |
|---|---|
| 50 BA/50 MMA | 11.5 |
| 50 BA/45 MMA/5AAEM | 11.0 |
| 36 2-EHA/64 MMA | 12.4 |
| 36 2-EHA/59 MMA/5 AAEM | 12.0 |
| 95 BMA/5 AAEM | 14.7 |

-continued

| Polymer Composition | Segmental Polarity |
|---|---|
| 50 BA/50 Styrene | 18.6 |
| 25 BA/75 Vinyl Acetate | 7.5 |
| 15 Ethylene/85 Vinyl Acetate | 8.8 |

AAEM = Acetoacetoxyethyl methacrylate
2-EHA = 2-Ethylhexyl methacrylate
MMA = methylmethacrylate
BA = butylacrylate The examples of segmental polarity calculations for a polymer (or copolymer) and for a flow promoter above illustrate how such calculations can be performed on any such substances, as is apparent and well demonstrated in the literature.

Preferably the flow promoters used in the invention are not volatile organic compounds. Preferably the flow promoters used in the invention have the general structure R—X, where R is an unsaturated alkyl moiety, and X is a group that confers the desired level of segmental polarity to the molecule. Suitable examples of R are C8-C22 unsaturated alkyl groups. Preferred examples of R—X are described in the table below, where R in these examples refers to a $C_{18}$ alkyl group with double unsaturation as is commonly derived from natural plant sources:

| —X group | Segmental Polarity of $C_{18}$—X |
|---|---|
| C=ONH2 (amide) | 18.70 |
| C=ONHCH3 (methyl amide) | 19.09 |
| C=OOCH3 (methyl ester) | 22.14 |
| C=OOCH2CHOHCH3 (propylene glycol mono-ester) | 18.42 |
| —NH2 (amine) | 21.65 |
| —NHCH3 (methyl amine) | 21.92 |
| —OH (alcohol) | 21.82 |
| —OCH3 (methyl ether) | 22.76 |
| —OCH2CH2OH (ethylene glycol monoether) | 18.49 |
| —OCH2CH2OCH3 (ethylene glycol methylether) | 19.48 |
| —CN (nitrile) | 22.34 |
| —Cl (chloride) | 26.60 |
| —C=OCH3 (methyl ketone) | 20.97 |
| —OC=OOCH3 (methyl carbonate) | 21.24 |
| —OC=OOCH2CH2OH (carbonate of ethylene glycol) | 17.41 |

Suitable raw materials for preparing the flow promoters useful in this invention include unsaturated fatty acids or mixtures of unsaturated fatty acids derived from plant sources such as corn oil, cotton seed oil, peanut oil, olive oil, castor oil, dehydrated castor oil, wheat germ oil, poppy seed oil, safflower oil, soybean oil, and sunflower seed oil, as well as certain unsaturated fish oils such as herring oil. Other suitable raw materials for preparing the flow promoters useful in this invention include fatty di and tri glycerides.

The flow promoter or flow promoter mixture contained in the aqueous composition preferably has an average iodine number of at least 50, more preferably at least 80, and even more preferably at least 100. The average iodine number is a measure of the degree of unsaturation, and is determined using ASTM method 1959-97. The aqueous composition containing one or more flow promoters having an iodine number of at least 50, preferably has sufficient reactivity in the presence of atmospheric oxygen to induce crosslinking in the dry coating.

Preferably, the flow promoters of the invention have a water solubility of less than 0.05%, more preferably less than 0.025%, most preferably less than 0.01% by weight at 25° C.

Most preferred flow promoters include the propylene glycol monoesters of sunflower oil or corn oil, or mixtures of them.

Copolymers useful to the invention are formed by the polymerization of at least one ethylenically unsaturated nonionic monomer. The copolymers may be formed by the polymerization of one or more ethylenically unsaturated monomers by any means known in the art including solution, emulsion, miniemulsion, microemulsion, or suspension polymerization processes. Preferred is aqueous emulsion or miniemulsion polymerization. The practice of emulsion polymerization is discussed in detail in D. C. Blackley, *Emulsion Polymerization* (Wiley, 1975) and H. Warson, *The Applications of Synthetic Resin Emulsions*, Chapter 2 (Ernest Benn Ltd., London 1972). If the polymers are formed by solvent-based polymerization methods, or if (co)solvents are used, the polymers may be subsequently be converted to aqueous dispersions by means known in the art. Polymers formed by solvent-based processes may be combined with the unsaturated flow promoters of the invention prior to being converted to an aqueous dispersion.

In those embodiments of the invention utilizing emulsion or miniemulsion polymerization processes conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is typically maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof.

When forming copolymers of the invention, conventional free radical initiators may be used such as, for example, hydrogen peroxide, sodium peroxide, potassium peroxide, t-butyl or t-amyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators (alternatively referred to as "oxidants") coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Ethylenically unsaturated nonionic monomers useful in the copolymers useful in this invention include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, styrene, substituted styrenes, ethylene, butadiene; vinyl acetate, vinyl butyrate and other vinyl esters; vinyl monomers such as vinyl chloride, vinyl toluene, and vinyl benzophenone; and vinylidene chloride.

Ethylenically unsaturated acid monomers useful in the copolymers useful in the invention include, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth) acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth) acrylates, phosphodialkyl crotonates, and allyl phosphate.

In some embodiments of this invention, copolymers formed by the polymerization of ethylenically unsaturated monomers may contain copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the polymers formed by the polymerization of ethylenically unsaturated monomers and/or to provide a different molecular weight distribution than would otherwise have been obtained with any free-radical-generating initiator(s).

The copolymer of the invention comprise from 75 to 100% by weight, based on the total weight of polymer, polymer having Mw of from 1,000 to 100,000. The copolymers useful in the practice of the invention preferably have Mw of 10,000 to 70,000, more preferably 25,000 to 40,000. The copolymer may comprise from 5 to 100% by weight, based on the total weight of polymer, polymer having Mn of from 1,000 to 50,000.

The Tg of the polymer is preferably from −20 to 60° C., more preferably −10 to 40° C., most preferably 0 to 30° C.

The copolymers of the invention are preferably formed from a monomer mixture comprising from 0.1 to 10%, preferably 0.5 to 7.5%, more preferably 1 to 5% ethylenically unsaturated acid monomers.

The copolymers of the invention have crosslinking groups pendant to the backbone of the polymer. In such embodiments the crosslinking groups can, upon drying, undergo reaction to form chemical bonds between polymer chains or with the flow promoter. This bond formation leads to improvements in properties of the dry composition, such as reduced tackiness, increased retention of flow promoter in porous substrates, increased duration of protection from moisture.

Examples of suitable crosslinking groups include groups containing one or more unsaturated carbon-carbon bonds; groups containing aldehyde or ketone moieties such as acetoacetoxy groups and cyanoacetoxy groups; urea groups such as ethyleneureido groups; hydroxyl groups. Preferred are acetoacetoxy groups and ethyleneureido groups.

Acetoacetoxy groups are represented by:

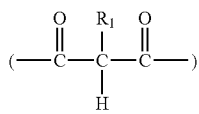

wherein $R_1$ is hydrogen, alkyl, or phenyl. Cyanoacetoxy groups are represented by:

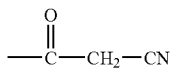

Ureido groups are represented by:

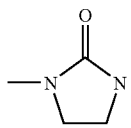

Crosslinking groups may incorporated into the copolymers of the invention by polymerizing ethylenically unsaturated monomers bearing crosslinking groups, optionally with other monomers used to form the polymer.

Ethylenically unsaturated monomers bearing groups containing one or more unsaturated carbon-carbon bonds include fatty acid esters of (meth)acrylates derived from fatty oils such as corn oil, castor oil, cotton seed oil, linseed oil, olive oil, rapeseed oil, safflower oil, soybean oil, sunflower seed oil, and tung oil.

Ethylenically unsaturated monomers bearing acetoacetoxy groups include acetoacetoxyethyl methacrylate ("AAEM"), acetoacetoxyethyl acrylate ("AAEA"), allyl acetoacetate, vinyl acetoacetate, vinyl acetoacetamide, acetoacetoxyethyl (meth)acrylamide, and combinations thereof. Preferred acetoacetyl functional monomers include acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth)acrylate, and combinations thereof. Ethylenically unsaturated monomers bearing cyanoacetoxy groups include cyanoacetoxyethyl (meth)acrylate, cyanoacetoxypropyl (meth)acrylate, allyl cyanoacetate, and vinyl cyanoacetate.

In embodiments wherein the polymer comprises pendant acetoacetate groups, the aqueous composition may comprise an excess stoichiometric amount, based on the moles of acetoacetate, of ammonia or primary amine to provide polymer particles bearing pendant enamine moieties.

Ethylenically unsaturated monomers bearing ethyleneureido groups include hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, ethyleneureidoethyl (meth)acrylate, (meth)acrylamidoethyl-ethyleneurea, N-(ethylenethioureido-ethyl)-10-undecenamide, butyl ethyleneureido-ethyl fumarate, methyl ethyleneureido-ethyl fumarate, benzyl N-(ethyleneureido-ethyl) fumarate, benzyl N-(ethyleneureido-ethyl) maleamate, N-vinoxyethylethylene-urea, N-(ethyleneureido-ethyl)-crotonamide, ureidopentyl vinyl ether, 2-ureidoethyl (meth)acrylate, (meth)acryloxyacetamido-ethylethyleneurea, N-(ethyleneureidoethyl)-4-pentenamide, N-((meth)acrylamidoethyl)-N-(1-hydroxymethyl)ethyleneurea, N-((meth)acrylamidoethyl)-N-(1-methoxy)methylethyleneurea, N-formamidoethyl-N-(1-vinyl)ethyleneurea, N-vinyl-N-(1-aminoethyl)-ethyleneurea, 2-(3-methylolimidazolidone-2-yl-1)ethyl acrylate, 2-ethyleneureido ethyl (meth)acrylate, 1-[2-(3-allyloxy-2-hydroxy-propylamino)ethyl]-imidazolidin-2-one, N-2-(allylcarbamoto)aminoethyl imidazolidinone, and 1-(2-((2-hydroxy-3-(2-propenyloxy)propyl)amino)ethyl)-2-imidazolidinone.

The flow promoter of the invention is present in the polymer particle at a level of from 15 to 100% by weight, based on the total weight of polymer in the particle. The combined weight of polymer and flow promoter comprises from 5 to 60%, preferably 20 to 50%, of the total weight of the aqueous composition.

The disperse particles of the aqueous dispersion may comprise more than one type of polymer, for instance the particles may comprise polymers of different composition, Tg, or molecular weight. The particles may also comprise more than one type of flow promoter. Other components of the aqueous composition may be present in the disperse particles.

The flow promoter-containing polymeric disperse particles of the aqueous dispersion may have a particle size of from 20 to 500 nm, preferably 20 to 250 nm, most preferably 50 to 150 nm. The particle size distribution may be unimodal, bimodal, multimodal, or broad.

Preferably, the aqueous composition comprises an auto oxidation catalyst which can act to accelerate the crosslinking of the aqueous composition upon drying. Auto oxidation catalysts are preferably metal ion catalysts such as cobalt, zirconium, calcium, manganese, copper, zinc and iron. Simple salts such as halides, nitrates, and sulfates maybe used but in many cases an organic anion such as the acetate, naphthenate or acetoacetonate is used.

In a preferred aspect of this invention, the flow promoter is combined with an aqueous dispersion of polymeric particles in the presence of 0.1 to 20%, preferably 0.2 to 10%, more preferably 0.5 to 5% by weight, based on the weight of flow promoter, a macromolecular organic compound having a hydrophobic cavity, as disclosed in U.S. Pat. No. 5,521,266. The macromolecular organic compounds having a hydrophobic cavity useful in the method of the invention include cyclodextrin and cyclodextrin derivatives; cyclic oligosaccharides having a hydrophobic cavity such as cycloinulohexose, cycloinuloheptose, and cycloinuloctose; calyxarenes; and cavitands.

The cyclodextrin and cyclodextrin derivatives useful in the method of the invention are limited only by the solubility of the cyclodextrin and cyclodextrin derivative selected under the particular polymerization conditions. Suitable cyclodextrins useful in the method of the present invention include, but are not limited to, a-cyclodextrin, b-cyclodextrin and g-cyclodextrin. Suitable cyclodextrin derivatives useful in the method of the present invention include, but are not limited to, the methyl, triacetyl hydroxypropyl and hydroxyethyl derivatives of a-cyclodextrin, b-cyclodextrin and g-cyclodextrin. The preferred cylodextrin derivative is methyl-b-cyclodextrin.

The cyclic oligosaccharides having a hydrophobic cavity, such as cycloinulohexose, cycloinuloheptose, useful in the invention are described by Takai et al., Journal of Organic Chemistry, 1994, volume 59, number 11, pages 2967-2975.

The calyxarenes useful in the invention are described in U.S. Pat. No. 4,699,966, International Patent Publication WO 89/08092 and Japanese patent publications 1988/197544 and 1989/007837.

The cavitands useful in the the invention are described in Italian patent application no. 22522 A/89 and Moran et al., Journal of the American Chemical Society, volume 184, 1982, pages 5826-5828.

The macromolecular organic compound having a hydrophobic cavity may be combined with the dispersion of polymeric particles, or with the flow promoter, or with the dispersion of flow promoter droplets prior to combining the flow promoter and polymer particles. Alternatively, the organic compound having a hydrophobic cavity may be added after combining the flow promoter and polymer particles.

Preferably an aqueous dispersion of droplets comprising the flow promoter is formed prior to combining the flow promoter with an aqueous dispersion of polymer particles. Such a droplet dispersion may be formed by combining water, surfactant, and the flow promoter. Flow promoter droplet size can affect the speed of the transport of flow promoter into a dispersed polymeric particle. Droplet sizes of 10 to 500 microns are effective in this invention. Droplet sizes of 10 to 100 microns are expected to speed the transport of flow promoter into a dispersed polymeric particle and are preferred. Small droplet sizes, as low as 100 nm will further accelerate the transport of flow promoter into dispersed polymeric particles.

The flow promoter, polymer dispersion, and macromolecular organic compound may be combined, with mixing, at a temperature of from 20 to 100° C., preferably from 40 to 90° C., most preferably 40 to 70° C. Preferably, the combined materials will be maintained with mixing at a temperature of from 40 to 100° C., more preferably 40 to 90° C., most preferably 40 to 70° C., for at least 15 minutes, preferably at least 30 minutes, more preferably at least 60 minutes.

In some embodiments of the invention a residual monomer reduction process is performed after the majority of the monomers used to form the polymer have been converted to polymer, said process typically including contacting the aqueous polymer dispersion with a free radical redox initiator system, the redox initiator system comprised of at least one oxidant and at least one reductant, and effecting the polymerization of at least some of the residual ethylenically unsaturated monomer. In such embodiments the residual ethylenically unsaturated monomer content of the dispersion will typically be less than 5%, preferably less than 1%, by weight, based on the weight of polymer in the dispersion, prior to performing the residual monomer reduction process. Preferably at least 50%, more preferably at least 90%, of the residual ethylenically unsaturated monomer is effected in the residual monomer reduction process. It is preferred that the flow promoter of the invention is combined with an aqueous dispersion of polymeric particles after the completion of all free radical polymerization of the ethylenically unsaturated monomers used to form the polymer of the invention, including any monomer reduction processes.

In some embodiments wherein the dispersed polymer particles comprise the polymerized residues of ethylenically unsaturated acid monomers a quantity of neutralizer, or base, may be added to the aqueous dispersion. Suitable neutralizers include, for example, ammonia, sodium hydroxide, potassium carbonate, and sodium bicarbonate. Neutralization of polymerized residues of ethylenically unsaturated acid monomers in the dispersed polymer particles may slow the transport of flow promoter into the particles. In embodiments wherein the flow promoter is combined with an aqueous dispersion of polymeric particles it is preferred that the flow promoter is combined with the polymeric particles when a quantity of base required to neutralize less than 90%, preferably less than 75%, more preferably less than 50%, most preferably less than 25%, of the acid monomer used to form the polymer, is present in the dispersion. The flow promoter and dispersed particles may be combined when no neutralizer is present in the dispersion.

In embodiments wherein the dispersed polymer particles are formed by emulsion polymerization techniques, the polymer may be formed in the presence of at least one neutralizer in the amount of from 5% to 50%, preferably from 5% to 25%, on an equivalents basis, based on the equivalents of ethylenically unsaturated acid monomer used to form the polymer. In such embodiments the neutralizing agent may be added to the polymerization vessel at any time before or during polymerization of monomers used to form the polymer, for instance in a single charge prior to any polymerization of monomers used to form the polymer, after the formation of some portion of the polymer, gradually during the polymerization of monomers used to form the polymer, or combinations thereof.

The aqueous compositions of the invention are useful in the formation of aqueous coating compositions.

Aqueous coating compositions may further comprise rheology modifiers; coalescents; solvents; biocides; wetting agents; defoamers; dyes; humectants; waxes; surfactants; fillers or extenders; colorants; flatting agents; neutralizers; buffers; freeze-thaw additives; plasticizers; antifoaming agents; tackifiers; hindered amine light stabilizers; UV absorbers such as benzophenone, substituted benzophenones, and substituted acetophenones; dispersants; anti-oxidants; and pigments.

Examples of suitable pigments and extenders include titanium dioxide such as anatase and rutile titanium dioxides; zinc oxide; antimony oxide; iron oxide; magnesium silicate; calcium carbonate; organic and inorganic colored pigments; aluminosilcates; silica; various clays such as kaolin and delaminated clay; and lead oxide. Aqueous polymer dispersion compositions may optionally contain opaque polymer particles, such as, for example, Ropaque™ Opaque Polymers (Rohm and Haas Co., Philadelphia, Pa.), which are useful for further improving the dry hiding of coating prepared from the aqueous polymer blend composition of this invention. In addition, extender particles with low oil absorption values are optionally added to the aqueous polymer blend composition of the invention, such as, for example, Expancel™ 551 DE20 acrylonitrile/vinyl chloride expanded particles (Expancel Inc., Duluth Ga.); Sil-Cell™ 35/34 sodium potassium aluminum silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™ 150 ceramic spherical particles (Trelleborg Fillite Inc., Norcross Ga.); Microbeads™ 4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England ); Z-light™ Sphere W-1200 ceramic hollow spheres (3M, St. Paul, Minn.); Scotchlite™ K46 glass bubbles (3M, St. Paul, Minn.); Vistamer™ UH 1500 polyethylene particles and Vistamer™ HD 1800 polyethylene particles (Fluoro-Seal Inc, Houston Tex.).

The amounts of pigment and extender in the aqueous composition vary from a pigment volume concentration ("PVC") of 0 to 85 and thereby encompass coatings otherwise described in the art, for example, as clear coatings, stains, flat coatings, satin coatings, semi-gloss coatings, gloss coatings, primers, textured coatings, and the like. Typically, higher pigment volume concentrations result in coatings having lower gloss. The pigment volume concentration is calculated by the following formula:

$$PVC(\%) = \frac{\text{(volume of pigments(s) + volume extender(s))}}{\text{total dry volume of paint}} \times 100.$$

VOCs may deliberately added to a paint or coating to improve the film properties of a coating or to aid in the application properties of the composition employed to prepare the coating. Examples of suitable VOCs are glycol ethers, organic esters, aromatic compounds, ethylene and propylene glycol, and aliphatic hydrocarbons. The inventive dispersions are particularly useful in the formation of aqueous coating compositions having less than 5% VOC; less than 3% VOC; less than 1.7% VOC by weight based on the total weight of the aqueous coating composition. The aqueous continuous phase of the inventive compositions may comprise water miscible organic compounds.

In preferred embodiments, an aqueous coating composition comprising the inventive dispersions has a PVC of less than or equal to 38 and has less than 5 wt. % VOC; or less than 3 wt. % VOC; or less than 1.7 wt. % VOC, based on the total weight of the aqueous coating composition.

In another preferred embodiment, an aqueous coating composition comprising the inventive dispersions has a PVC of greater than 35 and has less than 3 wt. % VOC; less than 1.7 wt. % VOC, based on the total weight of the aqueous coating composition. In an additional embodiment an aqueous coating composition comprising the inventive dispersions has a PVC of less than or equal to 85 and has less than 1.7 wt. % VOC; less than 0.5 wt. %; less than 0.1 wt. %, based on the total weight of the aqueous coating composition.

The inventive aqueous compositions are useful in the formation of primers, especially primers for application to porous or friable surfaces. "Friable surface" refers to porous, weak surfaces subject to attrition on abrasion and includes: chalky surfaces of coatings which have weathered to an extent that poorly consolidated pigment forms a surface layer on the coating; masonry surfaces, weathered or fresh, which have a poorly consolidated surface; wall board; weathered uncoated wood; and gypsum.

The aqueous compositions of the invention are suitable for use in the formation of sealers and stains for use on masonry substrates. Masonry substrates include concrete, brick, cement block, stucco, mortar, grout, and unglazed tile.

The inventive aqueous compositions are particularly useful in the formation of compositions for protective and decorative finishes, such as, water repellants; semi-transparent stains; clear varnishes; or solid color stains, for use on porous wood substrates. Porous wood substrates include wood, weathered or not, that has not been previously treated with a protective composition, and treated wood that has been rendered porous when a previous treatment has been degraded upon weathering. Compositions of this embodiment enter the pores of the wood to limit the subsequent penetration of water into the treated surface. Pores include cracks, cuts, open lumen, and exposed end grains. These compositions provide for a limited film thickness on the surface of the wood upon drying, such that at least one of the grain pattern, or the texture of the wood, is still visible to the naked eye.

EXAMPLE 1

One-Pot Synthesis of a Low Molecular Weight Acrylic Binder

A 5-liter, four-neck, round bottom flask was equipped with paddle stirrer, thermometer, nitrogen inlet and condenser. A mixture of 10 grams of Surfactant A* and 1200 grams of deionized water was added to the flask and heated to 86° C. under a nitrogen atmosphere. A monomer emulsion (ME) was prepared by mixing 650 grams of deionized water, 30 grams of Surfactant A, 1000 grams of butyl acrylate, 930 grams of methyl methacrylate, 70 grams of methacrylic acid, and 20 grams of 1-dodecanethiol. A solution of 5.5 grams of ammonium persulfate in 50 grams of deionized water was added. After stirring for 2 minutes, the ME was added to the flask at 85° C. over 70 minutes. A solution of 5.5 grams of ammonium persulfate in 110 grams of deionized water was added simultaneously to the flask over 70 minutes. When the ME and ammonium persulfate solution addition was complete, the ME container was rinsed with 25 grams of deionized water. The dispersion was held at 85° C. for 30 minutes and then cooled to 60° C. After addition of a mixture of 15 grams of 0.15% iron sulfate solution and 2 grams of 1% ethylenediaminetetraacetic acid, tetrasodium salt solution, two chase solutions (2.0 grams of 70% tert-butyl hydroperoxide in 25 grams of deionized water and 1.4 grams of isoascorbic acid in 25 grams of deionized water) were added over 30 minutes. This dispersion was cooled to room temperature, and filtered to remove any coagulum. The filtered dispersion had a pH of 3.1, and 45.6% of solids content, and an average particle size of 98 nm by BI-90.

*Surfactant A is a 31% solution in water of a mixture of surfactants comprising sodium ethoxylated $C_{10}$-$C_{16}$ alkyl ether sulfates having 3-7 ethylene oxide monomer residues per molecule.

EXAMPLE 2

Preparation of an Unmodified Molecular Weight Acrylic Binder

This sample used the same procedure and raw materials as Example 1 except that the ME contained no 1-dodecanethiol. The filtered dispersion had a pH of 3.0, and 45.5% of solids content, and an average particle size of 96 nm by BI-90.

EXAMPLE 3

Preparation of Low Molecular Weight Penetrating Acrylic Binder

A 1-liter, four necked round bottom flask was equipped with paddle stirrer, thermometer, and condenser. A mixture of 300 grams of the emulsion from Example 1 and 100 grams of deionized water were heated to 70° C. A solution of 5.6 grams of 28% ammonium hydroxide in 10 grams of deionized water was then added, followed by a solution of 2.76 grams of 50% methyl-β-cyclodextrin in 10 grams of deionized water. An emulsion of 4.6 grams of Surfactant A*, 70 grams of deionized water, and 138 grams of Archer RC reactive coalescent was prepared and added to the flask. The dispersion was stirred at 65-70° C. for 2 hours, cooled to room temperature, diluted to achieve a desirable viscosity with 100 grams of deionized water, and filtered to remove any coagulum. The filtered dispersion had a pH of 9.2, and 40.3% of solids content, and an average particle size of 136 nm by BI-90.

EXAMPLE 4

Preparation of Unmodified Molecular Weight Penetrating Acrylic Binder

This example used the same materials and procedure as Example 3 except for using 300 grams of emulsion from Example 2 in the initial mixture instead of from Example 1. This sample required 85 grams of deionized water for a final dilution. The filtered dispersion had a pH of 9.3, and 37.9% of solids content, and an average particle size of 114 nm by BI-90.

EXAMPLE 5

Preparation of Low Molecular Weight Penetrating Acrylic Binder

This example used the same materials and procedure as Example 3 except for using no methyl-β-cyclodextrin in the process. The filtered dispersion had a pH of 9.3, and 40.0% of solids content, and an average particle size of 165 nm by BI-90.

Particle size can be used as an indicator for determining whether or not the flow promoter is in the particle. It can also be an indicator of stability of an acrylic emulsion.

Particle size Data

| Unmodified Acrylic Binder | | Modified Acrylic binder | | |
|---|---|---|---|---|
| | PS | | PS | HA PS |
| Example 1 | 98 nm | Example 3 | 136 nm | 152 nm |
| | | Example 5 | 165 nm | Gelled |
| Example 2 | 96 nm | Example 4 | 114 nm | 194 nm |

The particle size of Example 3 increases compared to Example 1 indicating the flow promoter has been added to the latex particles. Example 4 shows less flow promoter is present in the particles. Example 5 shows an increase in particle size which indicates that the stability of the latex particle is compromised in this sample Heat Age Data

| Sample | Appearance | Before HA PS, nm | After HA PS, nm |
|---|---|---|---|
| Example 1 | No visible change | 98 | 100 |
| Example 2 | No visible change | 96 | 99 |
| Example 3 | No visible change | 136 | 152 |
| Example 4 | 6 mm clear layer on surface of sample | 114 | 194 |
| Example 5 | Extreme viscosity build(not pourable) | 165 | Gelled |

Heat Age Test:

The test uses a filled 2 ounce glass jar of the material to be evaluated. The jar is placed in a 60° C. Oven for 10 days. After 10 days a particle size measurement and a visual analysis on the sample is performed.

Examples 1 and 2 are the unmodified acrylic latex both of which show no stability problems in the heat age test. Example 3 also shows very good heat aged stability and contains the flow promoter. Example 4 shows an incompatibility or phase separation with a clear oil layer on the surface. Example 5 shows instability with the extreme viscosity build.

EXAMPLE 6

Preparation of Low Molecular Weight Penetrating Acrylic Binder

This example used the same procedure and materials as Example 3, except that soybean oil methyl ester was used in place of the propylene glycol monoester Archer RC. The final latex sample contained an oil layer at the top. This result shows that flow promoter with a difference in segmental polarity of 10.6 is too large to achieve full latex particle imbibing of the flow promoter.

EXAMPLE 7

Semi-Transparent Stain

The following represents two typical penetrating semi-transparent stain formulations using a Penetrating Acrylic Binder containing acetoacetoxy functionality. The semi-transparent stains were prepared by mixing the ingredients in the order that is listed in Formulation 1 and Formulation 2. The stains had a Pigment Volume Concentration of 2.2%, percent Volume Solids of 21.79%, and a Total Colorant Volume of 2.00 oz/gal. The VOC of stain A in Formulation 1 was 150 g/l. The VOC of stains B and C in Formulation 2 was 140 g/l.

TABLE 7.1

| Formulation 1 | |
|---|---|
| PREMIX | A |
| Water | 200.00 g |
| Dipropylene Glycol Monomethyl Ether | 15.32 |
| Octa-Soligen 421 Aqua Drier | 5.36 |
| Surfynol 104DPM Surfactant | 2.22 |
| Propylene Glycol | 5.50 |
| Troysan Polyphase P-20T Biocide | 1.00 |
| Premix Sub Total | 229.67 |
| Tego Foamex 805 Defoamer | 8.49 |
| Penetrating Acrylic Binder | 424.10 |
| Acrysol ™ RM-8W HEUR Thickener | 3.20 |
| Water | 169.54 |
| Degussa Colortrend 888-1810C Yellow Oxide | 10.13 |
| Degussa Colortrend 888-1045F Red Oxide | 3.12 |
| Degussa Colortrend 888-2009L Brn. Raw Umber | 9.03 |
| TOTAL | 857.29 g |

TABLE 7.2

| Formulation 2 | | |
|---|---|---|
| | B | C |
| Penetrating Acrylic Binder | 442.14 g | 0 g |
| Acrylic Binder (Non-Penetrating) | 0 | 455.74 |
| PREMIX | | |
| Additol VXW 4940 Drier | 4.42 | 0 |
| Water | 4.42 | 0 |
| Premix Sub-Total | 8.84 | 0 |
| Water | 147.40 | 147.40 |
| Dipropylene Glycol Monomethyl Ether | 22.76 | 22.81 |
| Surfynol 104DPM Surfactant | 5.20 | 5.20 |

TABLE 7.2-continued

| Formulation 2 | | |
|---|---|---|
| | B | C |
| Tego Foamex 805 Defoamer | 16.89 | 16.89 |
| Water | 186.98 | 184.91 |
| Degussa Colortrend 888-1810C Yellow Oxide | 10.11 | 10.11 |
| Degussa Colortrend 888-1045F Red Oxide | 3.12 | 3.12 |
| Degussa Colortrend 888-2009L Brn. | 9.03 | 9.03 |
| Raw Umber | | |
| TOTAL | 854.84 | 855.20 |

Exterior Exposure Resistance of Semi-Transparent Stains

Exterior Exposure Resistance is a measure of the ability of a stain to retain its original color and resist cracking, flaking, and peeling on decking boards after being subjected to natural outdoor exposure.

A decking board was sectioned into one foot sections. One coat of the test stains were applied to the board, each in a different section. The weight of stain applied was recorded. The boards were dried for 24 hours. The boards were then screwed down to an outdoor deck for exposure. The stains were typically evaluated after 1-2 months, and then after 6, 12, 24 months.

Properties evaluated include: general appearance, tint retention, any loss of adhesion, cracking, flaking, or peeling.

TABLE 7.3

| Exterior Exposure | | |
|---|---|---|
| Stain A | Commercial Stain 1 | Commercial Stain 2 |
| Very Good Tint Retention/Good Appearance | Some Tint Loss/Poor appearance | Color Fade/Color Loss |
| Very Slight Flaking | Heavy Flaking | Moderate Flaking |

The results in Table 7.3 show that the stain prepared with the penetrating acrylic binder, Stain A, has very good color retention during outdoor exposure when compared to Commercial Stains 1 and 2. The stain prepared with the penetrating acrylic binder, Stain A also shows to have improved flaking resistance and better overall appearance compared to Commercial Stains 1 and 2.

Cold Crack Adhesion Resistance of Exterior Semi-Transparent Stains

Cold Crack Adhesion Resistance is a measure of the ability of a stain to resist cracking and loss of adhesion on new copper quaternary pressure treated boards after being subjected to soaking in a continuous misting fog box and freezing and thawing cycles. This test is used to stimulate the type of freezing and thawing cycles that a stain applied to a wooden deck is subjected to in wet, colder climates.

The cold crack adhesion resistance of the stains were evaluated according to the following test method described in the section. A new copper quaternary pressure treated decking board was cut to a reasonable size and wiped down with a damp piece of cheese cloth. Two coats of each stain were applied in three inch sections, with a 4 hour dry time between coats. The side of the board used had the rings of the end grain facing down. The boards were dried at 24° C. and 50% relative humidity for 72 hours, and then an initial wet adhesion was done on the test areas.

Using an Excel Adhesion Knife, 2 knife cuts through the test samples were made forming an X intersecting at about a 30° angle. A 1"×1" piece of paper towel was placed over the X cut and dampened with about 2 mil of water and was let sit for 15 min. After 15 mins, paper towel was removed, water was blotted dry, and the X cut was allowed to dry for 10 mins. Permacel tape was applied over the X cut and rubbed to assure good contact. The tape was then pulled quickly at a 180° angle from the substrate. The % stain removed from the test area was rated.

The board was then placed in a continuous misting fog box for 4 hours. This was the beginning of the $1^{st}$ cycle. Immediately after the board was removed from the fox box, it was placed in a freezer for 16 hours. The board was then removed from the freezer and allowed to thaw at 24° C. and 50% relative humidity for 4 hours. That was the end of the $1^{st}$ cycle.

That procedure was done for a total of 10 cycles. The wet adhesion test was done after the $3^{rd}$, $5^{th}$, $7^{th}$, and $10^{th}$ cycles. A scrape test was also done after each wet adhesion test.

TABLE 7.4

| Cold Crack Adhesion | | | |
|---|---|---|---|
| | Stain B | Stain C | Commercial Stain 3 |
| | | % Stain Removed | |
| Initial | 0 | 5 | 1 |
| Cycle 3 | 0 | 10 | 5 |
| Cycle 5 | 1 | 5 | 15 |
| Cycle 7 | 1 | 10 | 5 |
| Cycle 10 | 1 | 10 | 10 |

The results in Table 7.4 show that the stain prepared with the penetrating acrylic binder, Stain B, has improved cold crack adhesion compared to both the Commercial Stain 3 and the non-penetrating acrylic binder in Stain C.

We claim:

1. An aqueous composition comprising from 5 to 60% by weight dispersed particles, the particles comprising: (1) at least one copolymer A; and (2) from about 15 to 100% by weight, based on the weight of the copolymer, of at least one unsaturated flow promoter with a segmental polarity difference of no greater than 8 relative to the polymer; wherein copolymer A is formed by the polymerization of at least one ethylenically unsaturated nonionic monomer and at least one monomer bearing a pendant functionality which can react with the unsaturated flow promoter upon drying and exposure to oxygen, wherein from about 75 to 100% by weight of the copolymer has a Mw of from about 1,000 to 100,000.

2. A composition of claim 1 wherein from about 5 to 100% by weight of the copolymer has a Mn of from 1,000 to 40,000.

3. A composition of claim 2 wherein the copolymer comprises from 0.5 to 20% by weight, based on the total weight of copolymer, at least one copolymerized monomer bearing pendant functionality which reacts with unsaturated flow promoters upon drying and exposure to oxygen.

4. A composition of claim 1 wherein the composition comprises from 0.1 to 20% by weight, based on the total weight of unsaturated flow promoter, of at least one macromolecular organic compound having a hydrophobic cavity, wherein the macromolecular organic compound is added after formation of the copolymer.

5. A composition of claim 2 wherein the composition comprises from 0.1 to 20% by weight, based on the total weight of unsaturated flow promoter, of at lest one macromolecular organic compound having a hydrophobic cavity, wherein the macromolecular organic compound is added after formation of the copolymer.

6. A composition of claim 3 wherein the pendant functionality is acetoacetate.

7. A composition of claim 1 further comprising at least one auto oxidation catalyst.

8. A composition, comprising:
(a) an aqueous dispersion of polymer particles, said particles comprising from 75 to 100% by weight, based on the total weight of polymer, and said polymer having a Mw of from 1,000 to 100,000;
(b) from 15 to 100% by weight, based on the weight of said polymer, at least one unsaturated flow promoter, and
(c) from 0.1 to 20% by weight, based on the total weight of flow promoter, at least one macromolecular organic compound having a hydrophobic cavity, wherein the macromolecular organic compound is added after formation of the copolymer.

9. A composition of claim 8 wherein a, b, and c are maintained at a temperature of from 40 to 90° C. for at least 15 minutes.

10. A composition of claim 1 wherein the unsaturated flow promoter is derived from corn oil, cottonseed oil, peanut oil, olive oil, dehydrated castor oil, wheat germ oil, poppy seed oil, safflower oil, soybean oil, sunflower seed oil, fish oil, or a combination comprising one or more of the foregoing oils.

11. A composition of claim 1 wherein the unsaturated flow promoter is a propylene glycol monoester of sunflower oil, corn oil, or a combination of sunflower oil and corn oil.

12. A process for making an aqueous composition comprising from 5 to 60% by weight dispersed particles, comprising:
combining water, a surfactant, and an unsaturated flow promoter, and applying mixing to form dispersed droplets of flow promoter;
combining the dispersed droplets of flow promoter with from 0.1 to 20% by weight, based on the total weight of flow promoter, of a macroscopic organic compound having a hydrophobic cavity and an aqueous dispersion of polymer particles, said particles comprising from 75 to 100% by weight, based on the total weight of polymer, and said polymer having a Mw of from 1,000 to 100,000, with mixing at a temperature of 20 to 100° C.; and
mixing at a temperature from 40 to 100° C. for at least 15 minutes.

* * * * *